United States Patent
Miao et al.

(10) Patent No.: US 7,749,123 B2
(45) Date of Patent: Jul. 6, 2010

(54) CYCLOID LIMITED SLIP DIFFERENTIAL AND METHOD

(75) Inventors: Hsu-Chiang Miao, Troy, MI (US); Chi-Kuan Kao, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 678 days.

(21) Appl. No.: 11/671,478

(22) Filed: Feb. 6, 2007

(65) Prior Publication Data

US 2008/0188341 A1 Aug. 7, 2008

(51) Int. Cl.
*F16H 13/06* (2006.01)

(52) U.S. Cl. .................. 475/184; 475/166; 475/174

(58) Field of Classification Search .............. 475/166, 475/174, 184, 185, 231, 249
See application file for complete search history.

(56) References Cited

U.S. PATENT DOCUMENTS

| | | | | |
|---|---|---|---|---|
| 3,130,604 A | * | 4/1964 | Johnson et al. | ............... 74/650 |
| 4,867,009 A | * | 9/1989 | Hudson | ....................... 74/650 |
| 5,104,361 A | * | 4/1992 | Jenkins | ....................... 475/184 |
| 5,928,101 A | * | 7/1999 | Hancock | ....................... 475/184 |

* cited by examiner

*Primary Examiner*—Ha D. Ho
(74) *Attorney, Agent, or Firm*—Quinn Law Group, PLLC

(57) ABSTRACT

A differential is provided comprising a rotatable differential housing, first and second output members, a first cycloid disk having an epitrochoid groove, a second cycloid disk having a hypotrochoid groove, a coupling disk connected having a plurality of holes each containing a sphere, wherein the spheres are engageable with the grooves for transferring torque between the cycloid disks. A method is also provided for distributing torque in a vehicle having two axles including at least one drive axle, including attaching one axle to a cycloid disk having a continuous epitrochoid groove, attaching another axle to a cycloid disk having a continuous hypotrochoid groove, attaching a rotatable housing to a center coupling disk having a plurality of holes, and positioning a torque transfer sphere that is engageable with the grooves in each of the holes, wherein the spheres are configured for distributing torque along the drive axles.

11 Claims, 3 Drawing Sheets

FIG. 4
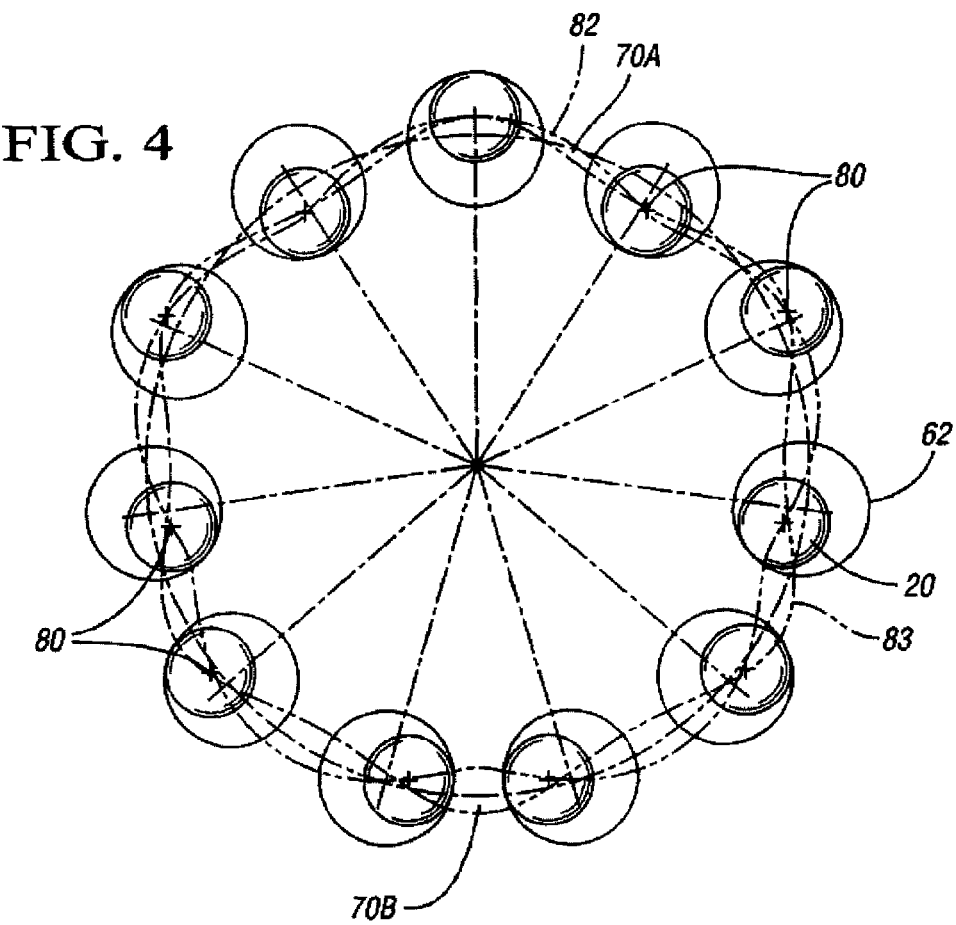
FIG. 5A
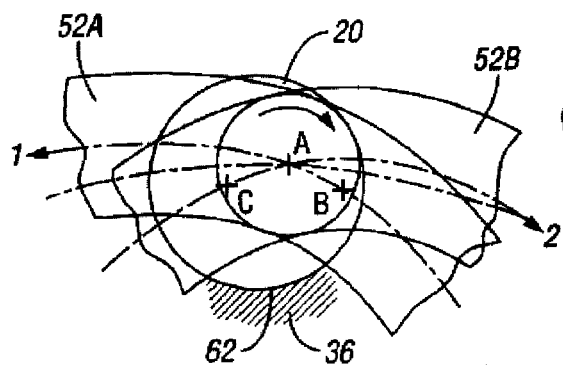
FIG. 5B
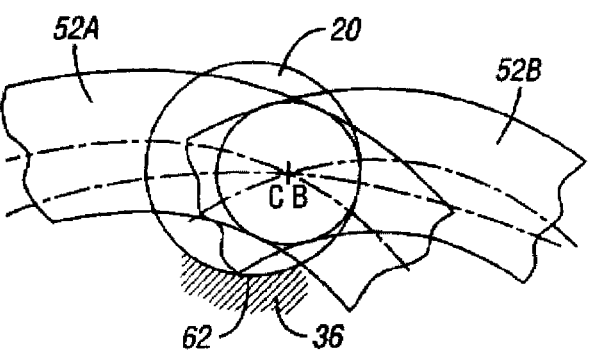
| | DISK 52A | DISK 52B | |
|---|---|---|---|
| STEP 1 | $\omega_c$ | $\omega_c$ | $\omega_c$ |
| STEP 2 | $\omega_1 - \omega_c$ | $-(z_1/z_2)(\omega_1 - \omega_c)$ | 0 |
| STEP 3 | $\omega_1$ | $\omega_c - (z_1/z_2)(\omega_1 - \omega_c)$ | $\omega_c$ |
FIG. 6

CYCLOID LIMITED SLIP DIFFERENTIAL AND METHOD

TECHNICAL FIELD

The present invention relates generally to a differential for distributing torque within a vehicle, and particularly to a cycloid differential having two cycloid disks that are mutually engageable via a plurality of spheres positioned within a center coupling disk.

BACKGROUND OF THE INVENTION

In vehicles having multiple drive axles, such as vehicles having full-time or automatic all-wheel drive (AWD) transmissions, the wheels on one drive axle at times must rotate or spin at a different relative speed than the wheels on the other drive axle in order to limit slippage due to poor traction at the road interface near one or more tires, such as when the vehicle passes over a patch of ice. Also, at times a wheel on one side of a drive axle of an AWD, front-wheel, or rear-wheel drive vehicle might need to rotate or spin at a different rate from that of the wheel disposed on the other side of the same drive axle, such as when the vehicle is turning.

To enable such disparate wheel rotational speeds, a coupling device known as a differential is commonly employed to divide torque from the engine and distribute or apportion the torque at two ends of a single drive axle or between multiple drive axles. Differential gears typically include a drive shaft that rotates a housing containing two or more planetary bevel gears, one on each of the driven shafts. The meshed bevel gears cause the sum of the rotation rates of the driven shafts to be held constant, although one bevel gear may rotate at a different rate than the other. However, bevel gears tend to be heavy, and the manufacture of limited slip differentials (LSDs) containing bevel gears is therefore relatively expensive. As a result, systems having such gear designs, including LSDs having add-ons such as multi-disk and/or viscous coupling, tend to carry a cost premium, and may be less than optimal in terms of size, weight, and smoothness of function.

SUMMARY OF THE INVENTION

Accordingly, a differential is provided having a center coupling disk operatively attached to a rotatable housing and disposed between a first and second cycloid disk, wherein each of the cycloid disks has a surface having a continuous cycloid groove, and each are operatively attached to one of two output shafts, wherein the differential is configured to distribute engine torque between the two output shafts through a plurality of spheres that are engageable with each of the cycloid grooves.

In one aspect of the invention, the center coupling disk has a plurality of holes each containing one of the plurality of spheres.

In another aspect of the invention, the first cycloid groove has an epitrochoid profile and the second cycloid groove has a hypotrochoid profile, wherein each of the spheres engages the first and second cycloid disks at the intersection of the profiles formed when the profiles are overlaid.

In another aspect of the invention, each of the cycloid disks has a plurality of lobes, and the number of holes equals the sum of the number of lobes.

In another aspect of the invention, a method is provided for distributing torque in a vehicle having a pair of axles comprising at least one drive axle, the method including connecting a drive axle to a first cycloid disk having a continuous epitrochoid cycloid groove, connecting a second axle to a second cycloid disk having a continuous hypotrochoid cycloid groove, connecting a rotatable housing to a center coupling disk having a plurality of holes each containing a torque transfer sphere, wherein the spheres are configured to be engageable with the grooves so that torque may be distributed as the spheres are repositioned within the cycloid grooves by the cycloid disks.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4 is a schematic showing the placement of the holes and torque transfer spheres of the center coupling disk with respect to intersecting cycloid curves;

FIGS. 5A and 5B are respective schematic plan views of the interactions between two rotating cycloid disks, a center coupling disk, and a torque transfer sphere according to the invention; and FIG. 6 is a table describing the speed relationship between each of the members of the differential according to the invention.

DESCRIPTION OF THE PREFERRED EMBODIMENTS

Figure 1:
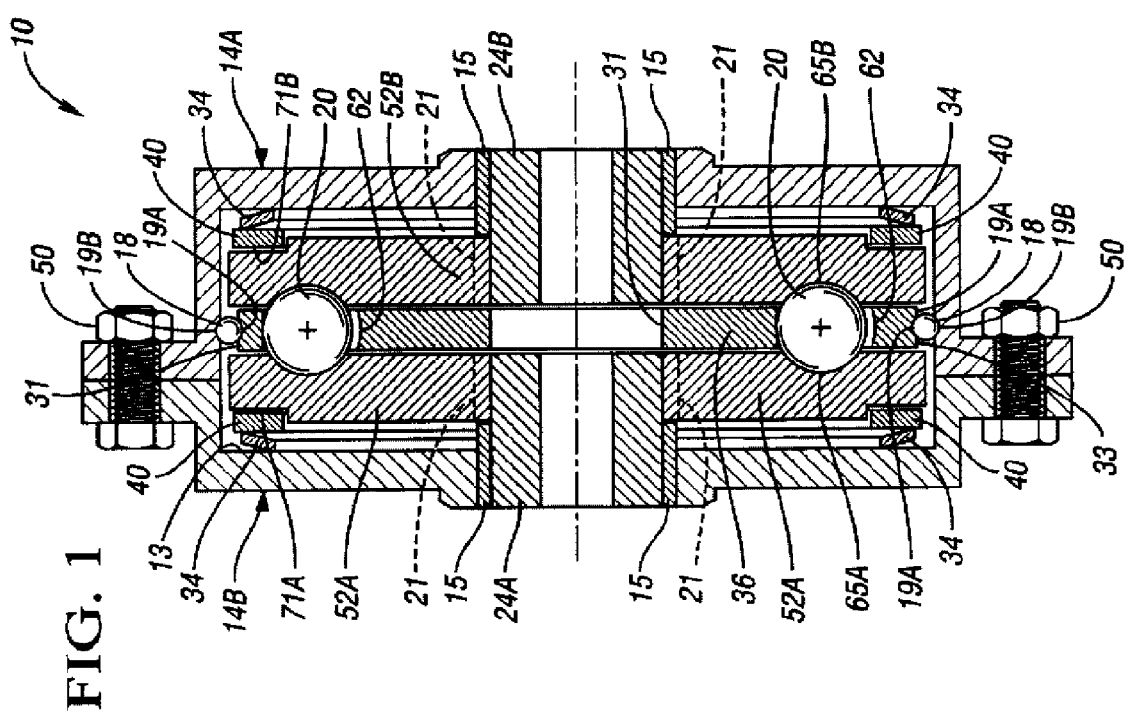
FIG. 1 is schematic cross-sectional view of a cycloid limited-slip differential according to the invention.

Referring to the drawings wherein like reference numbers correspond to like or similar components throughout the several figures, there is shown in FIG. 1 a cross-sectional view of a cycloid limited-slip differential 10 according to the invention. The differential 10 has a rotatable two-piece outer member, case, or housing 14A, 14B that is cast or otherwise formed and connected by bolts 50 or other suitable fasteners to form a unitary piece. The assembled housing 14A and 14B, hereinafter referred to as housing 14 for simplicity, is operatively attached to a rotatable drive member (not shown), such as a transmission drive shaft, so that the housing 14 rotates in conjunction with the drive member. The housing 14 has an inner wall 13 and at least partially encloses a first and second cycloid plate or disk 52A, 52B, respectively, with each of disks 52A and 52B positioned or oriented to face an opposite or opposing face or side of a center coupling disk 36. A compressible Belleville spring 34 and thrust washer 40 are preferably positioned adjacent to the disks 52A, 52B between the inner wall 13 of the housing 14 and each of the respective disks 52A, 52B to thereby compress the disks 52A, 52B within the housing 14 during no-load conditions. A pair of driven or output members 24A, 24B are operatively attached to a rotatable driven member (not shown), such as a pair of drive axles, and are rotatable with respect to housing 14 on bushings or bearings 15.

Cycloid disks 52A, 52B are operatively splined, keyed, or attached to a first and second output member 24A, 24B, respectively, to rotate or spin in conjunction therewith. A plurality of outwardly-projecting teeth or splines 21 are therefore disposed on each of the outer members 24A, 24B, and are drivably engageable with a plurality of notches or keyways 81 on the inner diameters 51A, 51B of each of the cycloid disks 52A, 52B (see FIGS. 3A and 3B). Center coupling disk 36 is positioned between the disks 52A, 52B and is operatively attached to the housing 14 to rotate therewith, preferably using a plurality of roller balls 18 positioned in opposing circular wells 19A, 19B formed in the center coupling disk 36 and housing 14, respectively, the balls 18 and wells 19A, 19B acting as a key and keyway. In this manner, center coupling disk 36 rotates or spins in conjunction housing 14, and is preferably lubricated and cooled by a fluid (not shown) which substantially fills the housing 14. Center coupling disk 36 further has an inner diameter 31, an outer diameter 33, and a plurality of circular openings or holes 62. A torque transfer ball or sphere 20 is positioned within each of the holes 62 and is rollingly engageable with a continuous cycloid ball track or groove 65A, 65B of cycloid disk 52A, 52B, respectively.

During torque transmission from the drive member (not shown) to the housing 14 of differential 10 (see FIG. 1), thrust forces are generated by the torque transfer spheres 20 against the cycloid disks 52A, 52B, thus forcing the thrust washer 40 axially outward and compressing the Belleville spring 34 flat against the inner wall 13. Therefore, Belleville spring 34 is preferably provided with an appropriate preload value so that the torque required to cause differential rotation of the cycloid disks 52A, 52B within the housing 14 is retained at an appropriately low level. Once acted upon by the thrust forces, the cycloid disks 52A, 52B (see FIG. 1) engage through the plurality of spheres 20 that are rollingly engageable within the pair of opposing grooves 65A, 65B respectively, which will now be described in further detail with reference to FIGS. 2 and 3.

Figure 2:
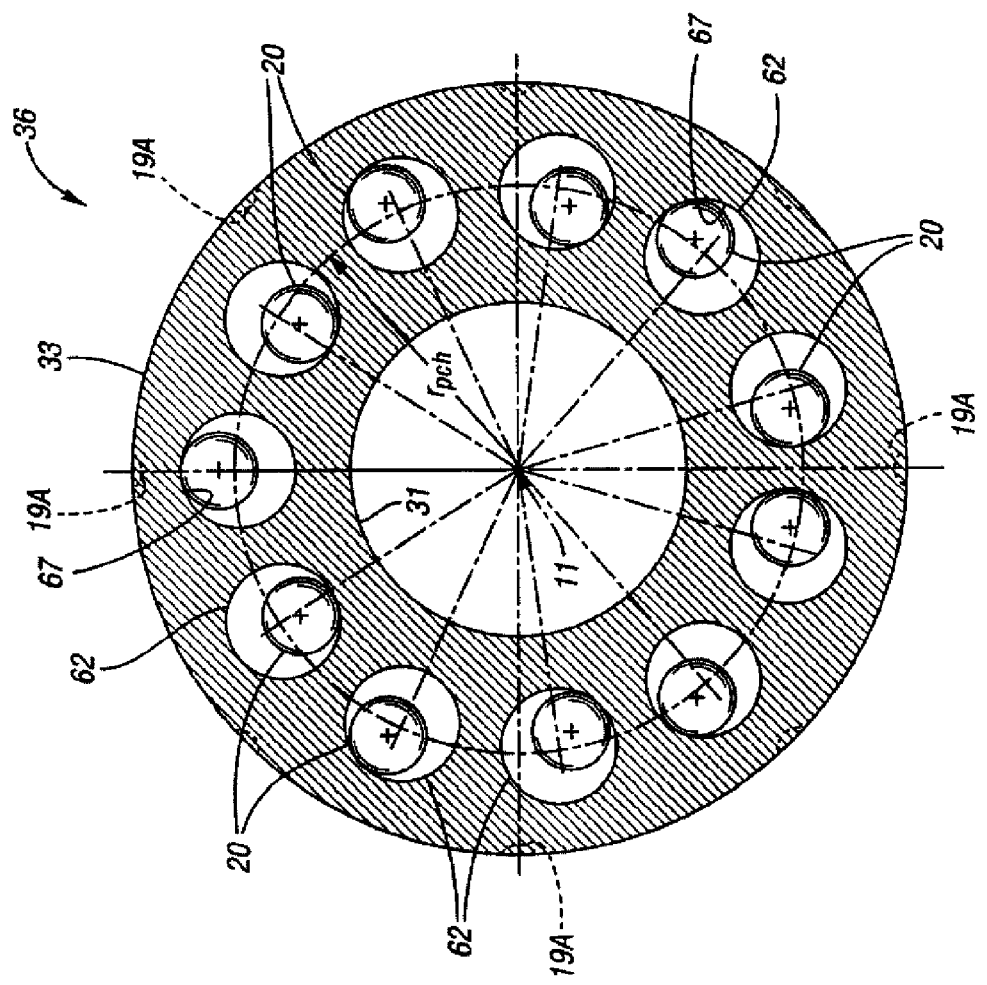
FIG. 2 is a schematic plan view of a center coupling disk useable with the differential according to the invention.

Turning first to FIG. 2, a plan front view of center coupling disk 36 is shown having a center 11, an inner surface or diameter 31, and an outer surface or diameter 33. A plurality of holes 62 are bored or formed in center coupling disk 36 and positioned at a pitch radius $r_{pch}$ measured from the center 11. The value $r_{pch}$ is preferably positioned or located midway between the inner and outer diameters 31 and 33, respectively. The coupling disk 36 is preferably constructed or formed of a suitable grade and strength of stainless steel or other metal, and each of the spheres 20 is configured to fit within a separate hole 62 with sufficient clearance to freely rotate in all directions. Because the spheres 20 will contact the walls or sides 67 of the holes 62, the spheres 20 and holes 62 should be constructed from materials having a suitable surface hardness and/or asperity profile to minimize frictional losses, wear, cracking, and other plastic deformation of the spheres 20 and holes 62 over the life of the differential 10 (see FIG. 1).

Figure 3A:
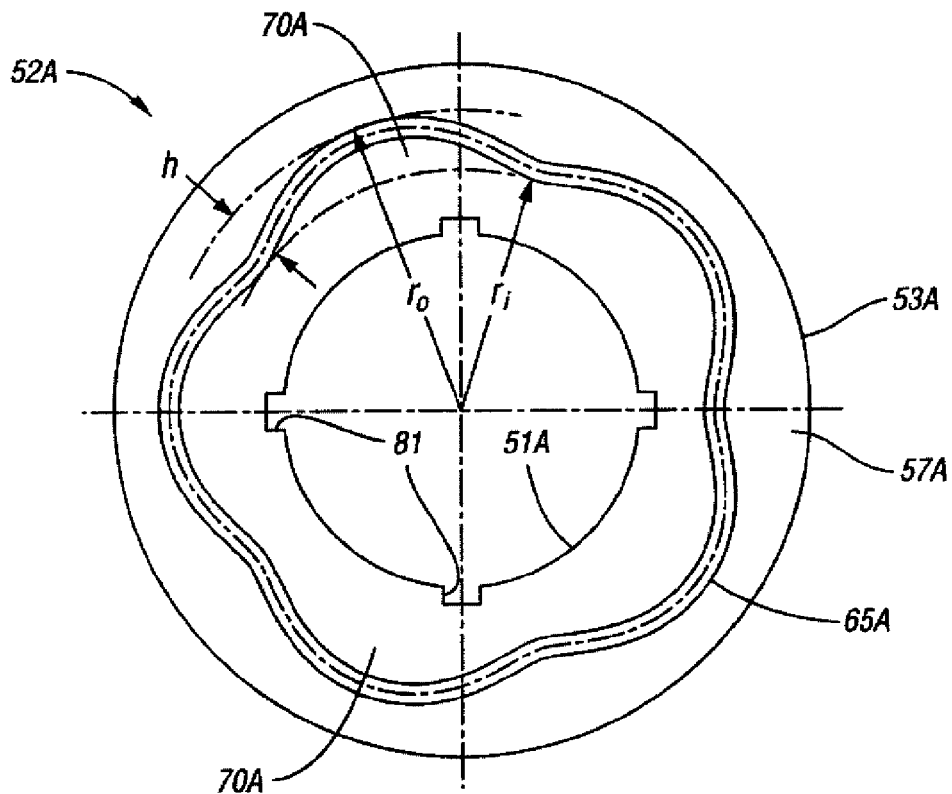
FIGS. 3A and 3B are respective schematic plan views of a first or left and second or right cycloid disk useable with the differential of the invention.
Figure 3B:
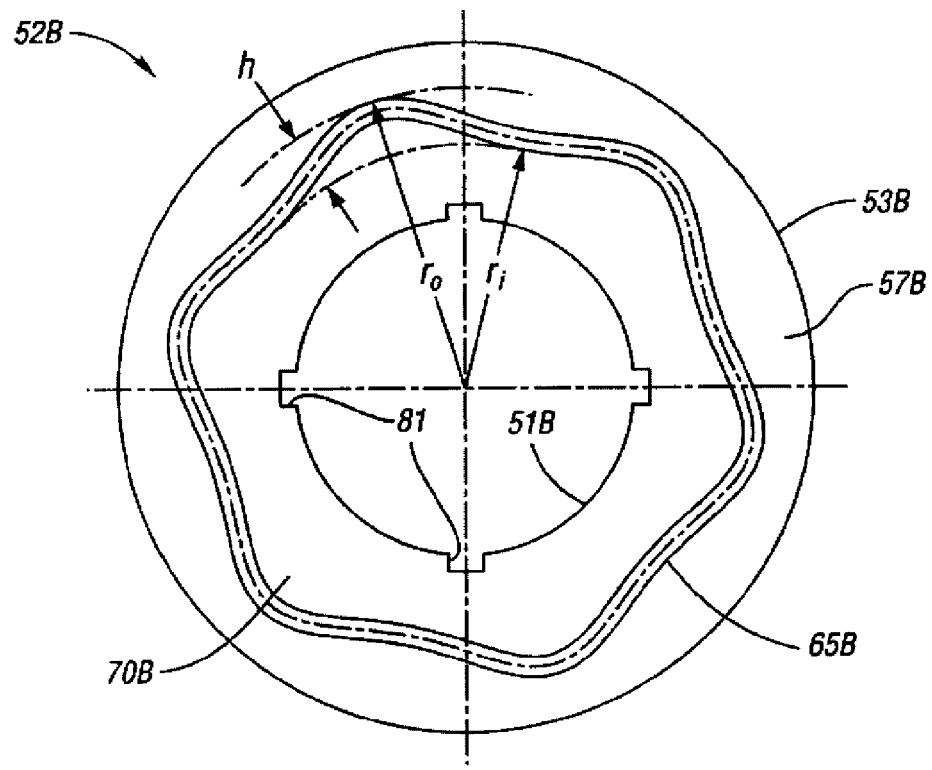

Turning to FIGS. 3A and 3B, first and second cycloid disks 52A, 52B are shown having an outer diameter 53A, 53B and an inner diameter 51A, 51B, respectively. Inner diameters 51A, 51B each have a plurality of inwardly-projecting notches, splines, or keyways 81 which are engageable with the teeth or splines 21 of each of the output members 24A, 24B (see FIG. 1). First cycloid disk 52A has a first cycloid groove 65A that is formed or cut into a face or main surface 57A of the first cycloid disk 52A, and a complimentary second cycloid groove 65B is formed or cut into a face or main surface 57B of the second cycloid disk 52B. Each of the grooves 65A, 65B has a plurality of teeth or lobes 70A, 70B, respectively, forming a continuous or closed-loop cycloidal path that will engage with each of the spheres 20 contained within the holes 62 of the coupling disk 36 to thereby transmit torque between the disks 52A and 52B.

First cycloid groove 65A preferably has an epitrochoid curve or profile, and second cycloid groove 65B preferably has a hypotrochoid curve or profile as shown. The terms "epitrochoid" and "hypotrochoid" are known in the art and refer generally to the specific cycloidal curve traced by a point positioned within the periphery of a tracing circle that rolls without slipping along the outer or inner surface, respectively, of another co-planar, circular curve or directrix. Since the first and second cycloid disks 52A, 52B are paired opposite the coupling disk 36 (see FIGS. 1 and 2), the respective tooth heights (h), outside radii ($r_o$), and inside radii ($r_i$) of the grooves 65A, 65B must be equal. This requirement can be met by design for any desired quantities $z_1$ and $z_2$, with variables $z_1$ and $z_2$ being equal to the number of lobes 70A, 70B of grooves 65A and 65B, respectively.

When the linear traces of the two grooves 65A, 65B are overlaid, the traces will have a plurality of intersection points 80, as shown in FIG. 4 for an epitrochoid 82 having five ($z_1$) lobes 70A and a hypotrochoid 83 with Six ($z_2$) lobes 70B, such as the cycloid disks 52A and 52B depicted in FIG. 2. Each of the holes 20 are equally spaced and positioned with respect to a different intersection point 80. For two cycloid disks with $z_1$ and $z_2$ lobes, as described previously hereinabove, the number of intersection points 80 and therefore the number of holes 62 is $z_1+z_2$. Accordingly, in the example of FIG. 4, with $z_1$=5 and $z_2$=6, there are eleven holes 62 as shown.

Turning back to FIG. 1, the operation of the cycloid differential 10 is initiated as torque is applied to rotate the housing 14. As the housing 14 begins to rotate or spin, torque is in turn transmitted to the attached center coupling disk 36, and from the center coupling disk 36 through the plurality of spheres 20 to the first and second cycloid disks 52A, 52B. When the vehicle is driven in a straight line, there is no relative rotation between disks 52A, 52B, and therefore torque is equally distributed between the two cycloid disks 52A, 52B and the two output members 24A, 24B to which the disks 52A, 52B are attached. However, when the vehicle makes a turn, the radii of the paths of the drive wheels disposed on opposite ends of a drive axle differ and, accordingly, the cycloid disks 52A, 52B will have disparate rotational speeds.

As a result of this rotational speed difference, the spheres 20 contained within the holes 62 of the center coupling disk 36 will rotate around the circumference of the holes 62 to accommodate the relative speed difference. For example, when the vehicle slips on a patch of ice or wet pavement, a large and largely instantaneous rotational speed difference occurs between the cycloid disks 52A and 52B. The forces between the spheres 20 and the cycloid grooves 65A, 65B (see FIG. 3), as well as the surfaces 71A, 71B of the cycloid disks 52A, 52B and the thrust washers 40 due to the spring load of the Belleville spring 34, all combine to produce friction torque that helps limit slippage.

The interaction of the center coupling disk 36 with the first and second cycloid disks 52A, 52B through the sphere 20 is shown in more detail in FIGS. 5A and 5B. The one-driver, two-follower device according to the invention has two degrees of freedom and acts as a simple differential, the operation of which may be described in three steps. First, center coupling disk 36 acts as the driver and rotates at a forward speed of $\omega_c$ with no respective input speed $\omega_1$ and $\omega_2$ from either cycloid disk 52A, 52B. Therefore, all three members are locked and rotate in unison, i.e. $\omega_c=\omega_1=\omega_2$, as shown in FIG. 5B. Second, assuming that $\omega_c$ is fixed and one of the cycloid disks 52A drives the other disk 52B through the sphere 20 at each intersection point 80 (see FIG. 4), and represented by position A in FIG. 5A, when cycloid disk 52A rotates counterclockwise (arrow 1) from position B to position A, cycloid disk 52B must rotate clockwise (arrow 2) from position C to position A in order to meet at the same radius position. Meanwhile, the sphere 20 rotates along the circumference of hole 62 to a common position as shown in FIG. 5B. Hence, if a cycloid disk having $z_1$ lobes rotates clockwise for a revolution, cycloid disk 52B must rotate $z_1/z_2$ in the opposite direction, that is, $\omega_2 = -z_2/z_1 (\omega_1)$, as shown in FIG. 6.

Third and finally, the speed relationship of each member may be obtained from the results of the previous two steps as shown in the table of FIG. 6. Therefore, for two independent input speeds $\omega_1$ and $\omega_c$, the speed $\omega_2$ of cycloid disk 52B becomes $\omega_c - (z_1/z_2)(\omega_1 - \omega_c)$, which is $z_1\omega_1 + z_2\omega_2 = (z_1 + z_2)\omega_c$. This formula is consistent with a simple planetary gear train and satisfies the requirement of being a differential drive. Hence, the differential 10 (see FIG. 1) as described hereinabove provides a continuous differential action, and may be used in AWD applications as a center differential for unequal torque split between front and rear drive axles, connectable respectively to output members 24A, 24B, as well as for distributing torque between the output members 24A and 24B as required when connected along a single drive axle in a rear-wheel or front-wheel drive application.

While the best modes for carrying out the invention have been described in detail, those familiar with the art to which this invention relates will recognize various alternative designs and embodiments for practicing the invention within the scope of the appended claims.

The invention claimed is:

1. A differential comprising:
   a rotatable housing;
   first and second output members;
   a first cycloid disk operatively connected to said first output member and having a first cycloid groove;
   a second cycloid disk operatively connected to said second output member and having a second cycloid groove;
   a coupling disk operatively connected to said rotatable housing and positioned between said first and second cycloid disks, and having a plurality of holes formed therein; and
   a plurality of spheres, wherein one of said plurality of spheres is positioned within each of said plurality of holes and is engageable with said first and second cycloid grooves for distributing torque from said rotatable housing between said first and second output members.

2. The differential of claim 1, wherein said first cycloid groove has an epitrochoid profile and said second cycloid groove has a hypotrochoid profile, and wherein each of said plurality of spheres engages said first and second cycloid grooves at the intersection of said profiles formed when one of said profiles is overlaid with the other of said profiles.

3. The differential of claim 1, wherein each of said cycloid disks has a plurality of lobes, and wherein the number of said plurality of holes is equal to the sum of said plurality of lobes.

4. The differential of claim 1, wherein each of said first and second output members is adapted for connection to an axle member selected from the group of a front drive axle and a rear drive axle.

5. The differential of claim 1, wherein said first and second output members are adapted for connection in an all-wheel drive transmission.

6. A differential comprising a center coupling disk operatively attached to a rotatable housing and disposed between first and second cycloid disks, wherein said cycloid disks each have a continuous cycloid groove and are operatively attachable to different output shafts, and wherein the differential is configured to selectively distribute torque from said center coupling disk to said different output shafts through a plurality of spheres that are engageable with said cycloid grooves.

7. The differential of claim 6, wherein said center coupling disk has a plurality of circumferential holes each containing a different one of said plurality of spheres.

8. The differential of claim 6, wherein said cycloid grooves include a first cycloid groove having an epitrochoid profile and a second cycloid groove having a hypotrochoid profile, and wherein each of said plurality of spheres engages each of said first and second cycloid disks at the intersection of said profiles when one of said profiles is overlaid with the other of said profiles.

9. The differential of claim 6, wherein each of said cycloid disks has a plurality of lobes, and wherein the number of said plurality of holes is equal to the sum of said plurality of lobes.

10. The differential of claim 6, wherein each of said first and second output members is adapted to be operatively connectable to an axle selected from the group of a front drive axle and a rear drive axle.

11. The differential of claim 6, wherein said different output shafts are adapted for use on an all-wheel drive transmission.

* * * * *